(12) United States Patent
Chan et al.

(10) Patent No.: US 9,340,903 B2
(45) Date of Patent: May 17, 2016

(54) PROCESS FOR MAKING FILAMENT HAVING UNIQUE TIP AND SURFACE CHARACTERISTICS

(71) Applicant: The Procter & Gamble Company, Cincinnati, OH (US)

(72) Inventors: John Geoffrey Chan, Maineville, OH (US); Li Wen, Blue Ash, OH (US); Elizabeth Ann Brown Reno, Fairfield, OH (US); John Kit Carson, Liberty Township, OH (US); Xiaole Mao, Mason, OH (US)

(73) Assignee: THE PROCTER & GAMBLE CO, Cincinnati, OH (US)

( * ) Notice: Subject to any disclaimer, the term of this patent is extended or adjusted under 35 U.S.C. 154(b) by 156 days.

(21) Appl. No.: 14/301,716

(22) Filed: Jun. 11, 2014

(65) Prior Publication Data

US 2015/0361590 A1    Dec. 17, 2015

(51) Int. Cl.
*A46D 1/00* (2006.01)
*A46D 1/04* (2006.01)
*B29C 61/02* (2006.01)
(Continued)

(52) U.S. Cl.
CPC .............. *D01D 10/02* (2013.01); *A46D 1/023* (2013.01); *A46D 1/0207* (2013.01); *A46D 3/00* (2013.01); *B29C 61/02* (2013.01); *D01D 5/34* (2013.01); *D01D 5/36* (2013.01); *A46B 2200/1066* (2013.01); *A46D 1/0246* (2013.01)

(58) Field of Classification Search
CPC .............. A46B 2200/1066; A46D 1/0207; A46D 1/023; A46D 1/0246; A46D 1/04; A46D 1/05; A46D 3/00; B29C 61/02; B29C 61/025; B29C 61/0608; B29C 61/0616; B29C 61/0658; Y10T 428/2973; Y10T 428/2976

See application file for complete search history.

(56) References Cited

U.S. PATENT DOCUMENTS

| 3,214,777 A | 11/1965 | Kutik |
| 3,613,143 A | 10/1971 | Muhler et al. |

(Continued)

FOREIGN PATENT DOCUMENTS

| JP | 08-187126 A | * 7/1996 |
| JP | 2012105743 | 6/2012 |

(Continued)

OTHER PUBLICATIONS

International Search Report with written opinion, mail date Sep. 2, 2015, 10 pages.

*Primary Examiner* — Michael Tolin
(74) *Attorney, Agent, or Firm* — Vladimir Vitenberg; James E. Oehlenschlager

(57) ABSTRACT

A process for making a filament for use in a brush implement comprises providing a composite filament comprising an external material and at least one internal material, wherein the tip surface comprises the internal material surrounded by the external material, the internal material having longitudinal shrinkage characteristics that differ from those of the external material; and causing the internal material to shrink inside the external material, whereby the internal material comprising the tip surface sinks relative to the external material comprising the tip surface so that at least one crater is formed at the tip surface of the filament, the at least one crater comprising a bottom formed by the internal material and walls formed by the external material, the at least one crater having a surface edge of a predetermined size and a predetermined shape.

20 Claims, 11 Drawing Sheets

(51) Int. Cl.
*D01D 10/02* (2006.01)
*D01D 5/34* (2006.01)
*D01D 5/36* (2006.01)
*A46D 3/00* (2006.01)

(56) References Cited

U.S. PATENT DOCUMENTS

| | | |
|---|---|---|
| 4,167,794 A | 9/1979 | Pomeroy |
| 4,958,402 A | 9/1990 | Weihrauch |
| 4,993,440 A | 2/1991 | Gueret |
| 5,770,307 A * | 6/1998 | Rackley .......... A46D 1/00 15/207.2 |
| 6,138,314 A | 10/2000 | Schiff et al. |
| 2007/0001037 A1 | 1/2007 | Huang |
| 2015/0359326 A1 | 12/2015 | Chan et al. |

FOREIGN PATENT DOCUMENTS

| | | |
|---|---|---|
| WO | WO9834514 | 8/1998 |
| WO | WO2004002261 | 1/2004 |

* cited by examiner

PROCESS FOR MAKING FILAMENT HAVING UNIQUE TIP AND SURFACE CHARACTERISTICS

FIELD OF THE INVENTION

The present invention relates to cleaning elements, such as filaments or bristles, having unique tip and surface characteristics. More specifically, the invention is directed to a filament having tip-and-surface characteristics providing the filament with enhanced abrasion efficiency and an ability to entrap and entrain particles of certain predetermined size. The invention is also directed to a process for making such a filament.

BACKGROUND

Cleaning elements, such as bristles, are used in many personal-care and commercial implements, such as, e.g., those used in oral-care and beauty-care applicators, as well as industrial brush products. Generally, a bristle, or a filament, is a thin flexible fiber terminating with a free end, or tip, when it is incorporated into a finished implement, such as a brush. Examples of such implements, comprising a plurality of fibers, include, without limitation, toothbrushes, mascara and other cosmetic brushes, painting brushes, and various cleaning brushes.

In many of those applications, a brush implement is designed to perform at least one of the two functions: (1) a delivery or application of a material to an object and (2) a removal of a material from an object. In many instances, the efficacy with which these functions are performed by an implement is highly influenced by the surface characteristics of the filaments.

In the field of oral care, for example, it is well known that regular tooth brushing with a dentifrice is an effective means of reducing or preventing tooth decay, periodontal disease, removing food debris, and massaging the gums. Commercially available toothbrushes typically include monofilament or co-extruded filament bristles mounted on a plastic support. The thin flexible bristles are smooth elements of which the ends are cut off at right angles and are often rounded to form dome-like tips. Most commercial dentifrice include a mild abrasive particles ranging from about 10% to 25% by weight to improve the composition's ability to remove adherent soiling matter, to free accessible plaque, to dislodge accessible debris and to eliminate superficial stain from teeth. But the smooth, dome-like tips are not designed for effective pick up and utilization of the particles in dentifrice. Nor can they have effective abrasion efficiency against dental plaque. When no abrasive particle is present, filaments with lesser degree of end-rounding are believed to be more effective for cleaning. Their hard peripheral edges, however, can lead to excessive damage in both hard and soft tissues in the oral cavity.

Multiple attempts to address these and similar problems have been made. For example, U.S. Pat. No. 6,138,314 is directed to a toothbrush having an improved cleaning and abrasion efficiency. The bristles in that toothbrush contain longitudinal channels having a depth sufficient to entrap a quantity of abrasive particles such that during brushing with toothpaste, contact between the channel-entrapped abrasive particles and the surfaces of the teeth is improved. U.S. Pat. No. 3,613,143 is directed to a toothbrushes having abrasive impregnated bristles of two cross-section designs, i.e., to generally circular and polygon with the latter described as having longitudinal groove arrangements. U.S. Pat. No. 4,167,794 is directed to rounded bristles having shovel-like distal ends for more effective plaque removal. U.S. Pat. No. 4,958,402 is directed to fiber-flocking synthetic bristles that can retain and more effectively distributing a substance on the surface to be treated. U.S. Pat. No. 3,032,230 is directed to bristles having a polygon cross-section having at least two acute angles that impart a "scraping" effect on the teeth. U.S. Pat. No. 3,214,777 is directed to bristles having a rectangular cross-sectional area. U.S. Pat. No. 4,993,440 is directed to a cosmetic brush comprising bristles having capillary channel extending from the base to the tip of the bristles. The channel has a V-shaped or U-shaped cross section designed to hold the mascara.

Coextruded monofilaments having a core made of one material and a sheath made of another material are also known. For example, U.S. Pat. No. 5,770,307 is directed to a coextruded monofilament having a core material made of a first resin and a sheath material made of a second resin, with the second resin being different from the first resin, and a pocket formed in the end of the monofilament. The purpose of the pocket is to hold a material, such as a cleaning material, so that the cleaning material in the monofilament has a longer contact with the surface to be cleaned than if the cleaning material was on the rounded end of a conventional monofilament. For example, if the coextruded monofilament is used in a toothbrush bristle, the pocket will hold toothpaste in contact with a tooth longer than a coextruded monofilament with a conventional rounded end. The pocket formed in the end of a coextruded monofilament can be made by chemical or mechanical means, or a combination of chemical and mechanical means. While the filament having a pocket, disclosed in this patent, appears to allow retention of a cleaning material inside the pocket, the structure of the disclosed filament itself does not appear to offer additional abrasion efficiency.

The present disclosure is directed to further improvements of the filaments.

SUMMARY OF THE DISCLOSURE

In one aspect, the disclosure is directed to a filament for use in a brush implement can be a bi-component filament or a multi-component filament. The filament comprises an external material and at least a first internal material. A non-limiting example of the external material is a material comprising polyester. A non-limiting example of the internal material is a material comprising polyamide. The external material and the internal material may be beneficially selected to differ from one another in at least one characteristic or physical property, non-limiting examples of which include color, elasticity, density, hardness, surface energy, heat-shrinkage rate, longitudinal anisotropic-shrinkage rate, isotropic-shrinkage rate, bending-shrinkage rate, and any combination thereof. In an embodiment of the filament comprising two or more internal materials, one internal material can differ from the other internal material or materials in at least one physical property selected from the group consisting of color, elasticity, density, hardness, surface energy, heat-shrinkage rate, longitudinal anisotropic-shrinkage rate, isotropic-shrinkage rate, bending-shrinkage rate, and any combination thereof.

The internal material may comprise a single strand of material extending inside the filament along the longitudinal axis thereof. In such a configuration, the filament has a single crater disposed at the tip surface. In an embodiment of the filament comprising two or more internal materials, the filament may comprise a plurality of strands of material, or a plurality of strand of different materials, separated from one another by the external material. In this configuration, the filament has a plurality of craters disposed at the tip surface.

The filament comprises an elongated flexible body having a length, a longitudinal axis, and a longitudinal outer surface. The filament's outer surface comprises the external material. One skilled in the art will readily understand that because the filament is a flexible structure, its longitudinal axis follows the shape of the filament. The filament terminates with a tip having a tip surface that comprises the external material. The tip surface has a plurality of craters distributed throughout the tip surface in a predetermined pattern. Each of the craters has a surface edge of a predetermined size and a predetermined shape, walls extending longitudinally from the surface edge and comprising the external material, and a bottom comprising the at least first internal material and situated at a depth from the surface edge, wherein the surface edge is formed by the walls and the tip surface. The external material has a first length and the at least first internal material has a second length. The first length is greater than the second length, and a difference between the first length and the second length constitutes the depth of the craters. In instances where a single crater has a differential depth (e.g., as a consequence of the convex tip), the depth is measured as the largest distance between the bottom and the edge of the crater taken parallel to the longitudinal axis of the filament.

The filament can have a tip surface of any suitable shape. In one exemplary embodiment, the tips surface can at least partially be convex. In another embodiment, the tip surface can at least partially be planar, or flat. In yet another embodiment, the tip surface can at least partially be concave. Embodiments are contemplated in which the tip surface comprises a combination of at least two of the above-listed shapes—or comprises an irregular shape.

In the present disclosure, the structure of the craters will be predominantly described with respect to a single crater, for convenience. The crater's walls are substantially "vertical"—and substantially parallel to the filament's longitudinal axis. As used herein, the term "substantially parallel" is intended to mean that minor deviation of absolute parallelism are accepted. As is pointed out herein above, any reference to the filament's axis and relationship between the axis and other elements of the filament should be understood in the context of the fact that the filament is a flexible structure that may have any suitable shape. In some embodiments, the walls of the crater and the filament's longitudinal axis may form therebetween an angle of less than 10 degrees.

The filament of the invention is believed to provide improved abrasion efficiency by virtue of having multiple abrasion surfaces, comprising edges, located at the filament's tip. The craters, disposed on the tip of the filament, have closed surface edges having certain sharpness that provides enhanced abrasion qualities. The terms "sharp," "sharpness," and the like are used herein in their conventional sense, describing a condition of an element having a thin keen edge, as opposed to a blunt or rounded edge. This sharpness can be defined by a radius of curvature existing between the walls of the crater and the surface of the tip surface comprising the external material. In one embodiment, the surface edge of the crater has a curvature radius that is less than 5 µm. In another embodiment, the surface edge of the crater can have a curvature radius of less than 3 µm.

The sharp edge, which has essentially a length and a shape of a tip-surface perimeter of the crater, can have any suitable form. Non-limiting examples include: a circle, an ellipse, a polygon, a star, and any combination thereof, including regular and irregular shapes. The crater may have an equivalent diameter of from 1 µm to 70 µm. In another embodiment, the crater may have an equivalent diameter of from 2 µm to 50 µm. In still another embodiment, the crater may have an equivalent diameter of from 3 µm to 30 µm. The number of craters, created at the tip surface of the filament, can range from a single crater to any desired number, e.g., at least three or at least five craters, or can be between five and ten or between five and twenty five.

Individual craters can differ from one another with respect to one or several parameters, including, without limitation, crater's depth, shape, and size. In an embodiment of the filament comprising two or more internal materials, the difference in craters' depth can be created by using internal materials having differential shrinkage characteristics, particularly longitudinal anisotropic shrinkage characteristics. Anisotropic shrinkage refers to shrinkage that has different magnitudes in different directions, while isotropic shrinkage has the same magnitude in different directions.

In the fiber of the invention, having a composite structure comprising the external material and the internal material, anisotropic shrinkage in the longitudinal direction occurs in the internal material, and may occur in the external material. Anisotropic shrinkage in the longitudinal direction of the fiber occurs primarily because the polymer chains tend to orient themselves along the longitudinal direction of the fiber being made during drawing down and cooling of the fiber—and hence have a much higher shrink rate along the longitudinal direction than that in cross direction. The internal material and the external material have different shrinkage rates along the fiber's axis: the longitudinal shrinkage rate of the internal material is higher than that of the external material. The longitudinal shrinkage of the internal material inside the external material results in the craters formed on the filament's tip surface. The crater may have the depth of from 3 µm to 30 µm. In other embodiments, the depth may be from 1 µm to 15 µm; and even more specifically from 4 µm to 15 µm.

In another aspect, the disclosure is directed to a filament for use in an oral-care brush implement. Such a filament, similar to the filament described herein above, comprises an elongated flexible body having a length, a longitudinal axis, and a longitudinal outer surface comprising an external material, the elongated flexible body terminating at a free end thereof with a tip having a tip surface comprising the external material. The tip surface of the filament has a plurality of craters distributed therethrough in a predetermined pattern. The craters have surface edges of predetermined sizes and shapes. The craters also have walls extending longitudinally from the edges and comprising the external material. Each of the craters has a bottom comprising at least a first internal material, wherein the bottom is situated at at least a first depth from the surface edge. The external material differs from the at least first internal material in at least one physical property selected from the group consisting of color, elasticity, density, hardness, surface energy, heat-shrinkage rate, longitudinal anisotropic-shrinkage rate, isotropic-shrinkage rate, bending-shrinkage rate, and any combination thereof.

In still another aspect, the disclosure is directed to an oral-care implement including at least one cleaning element, wherein the at least one cleaning element comprises a filament having a crater or craters on its tip surface, as described herein. In a further aspect, the disclosure is directed to an oral-care implement in combination with a dentifrice, wherein the dentifrice comprises a plurality of dentifrice particles, and wherein the crater or craters is/are sized to at least partially accept therein at least one of the dentifrice particles. As a non-limiting example, the dentifrice particles may have an average particle size or average equivalent diameter of from about 5 microns to about 20 microns, and the crater may have an equivalent diameter of from at least 15 microns to about 30 microns and the depth of from about 5 microns to about 15 microns.

In embodiments in which the at least first internal material comprises two or more internal materials that differ from one another in at least one physical property selected from the group consisting of color, elasticity, density, hardness, surface energy, heat-shrinkage rate, longitudinal anisotropic-shrinkage rate, isotropic-shrinkage rate, bending-shrinkage rate, and any combination thereof. In such embodiment, the bottoms of the craters, formed by different internal materials, can be situated at different depths from the corresponding edges of the craters.

An embodiment is disclosed in which the filament of the invention is structured to have the crater's depth, or craters' depths, gradually increase with the intended use of the oral-care brush implement. This aspect of the disclosure will be detailed herein below, in the context of a process for making the filament.

Process

In its process aspect, the disclosure is directed to a process for making a filament having at least one crater at a tip surface of a free end of the filament. The process comprises: providing a composite filament comprising an external material and an internal material, wherein the tip surface comprises the internal material surrounded by the external material, the internal material having longitudinal shrinkage characteristics that differ from those of the external material; causing the internal material to shrink inside the external material, whereby the internal material comprising the tip surface sinks relative to the external material comprising the tip surface so that at least one crater is formed at the tip surface of the filament, the at least one crater comprising a bottom formed by the internal material and walls formed by the external material, the at least one crater having a surface edge of a predetermined size and a predetermined shape.

The process may further comprise any and all of the following, typically conventional, steps: producing a continuous filament; cutting the continuous filament into a plurality of filaments of a predetermined length; attaching the cut filament into a toothbrush head by stapling, hot tufting, or any other known means; and profiling, trimming, end-rounding, polishing the tip surface of the filament. Any known means of accomplishing these steps can be used, if suitable, in the process of the disclosure. For example, producing a continuous bi-component or multi-component filament can be accomplished by any suitable extrusion method, e.g., co-extrusion, followed by drawing. Extrusion may include multiple spinning techniques, such as, e.g., wet spinning, dry spinning, melt spinning, gel spinning, electro-spinning, jet-wet spinning, and the like. Another technique for continuous production of composite filaments having constant cross-section is known as "pultrusion."

Cutting the continuous filament into a plurality of filaments of predetermined length can be accomplished by conventional cutting means, such as a cutting blade, and a laser beam, or by known chemical means. Polishing/profiling, including end-rounding, of the filament's tip surface can be accomplished by any suitable equipment known in the art. The tip surface of the filament can be profiled to acquire any desired shape, such as, e.g., a convex shape, a concave shape, a flat shape (either planar or angular), and any combination thereof.

In order to accomplish the creation of the craters having a desired shape and depth at the tip surface of the filament, the process may beneficially comprise a step of preventing the internal material from moving relative to the external material inside the filament at a location removed from the tip surface of the filament. Thus, the internal material will be naturally caused to shrink essentially in one direction, away from the tip surface of the filament. Therefore, the step of profiling the tip surface of the filament can be beneficially performed prior to causing the internal material to shrink inside the external material. Likewise, preventing the internal material from moving relative to the external material inside the filament can be beneficially performed prior to causing the internal material to shrink inside the external material.

Any suitable technique allowing fixing the internal material relative to the external material at a location remote from the filament's free end can be used. In one embodiment of the process, the filament can be affixed to a body of an oral-care implement at an end of the filament that is opposite to the tip of the filament. This can be done by using any known method of attaching cleaning filaments to an oral-care implement, such as a toothbrush. Non-limiting examples of these methods may include stapling, hot tufting, overmolding with a plastic material, and any combination thereof. One skilled in the art will appreciate that if the internal material is not fixed relative to the external material, the internal material may recede at two opposite tips of the filament. For example, in a brush made using traditional stapling technique, the filament typically forms a U shape in the area of stapling, in a tuft hole. There, the filament's center can be fixed to the brush head by an anchor or slug on, and the opposite tips of the filament so configured are exposed as the brushing tip surface. If the internal material is not fixed relative to the external material by the stapling, the longitudinal shrinkage of the internal material relative to the external material will likely be symmetric relative to the filament's central portion, located in the tuft hole. Hence the craters can be formed at both ends of the U-shaped filament.

After the internal material has been fixed to, or otherwise prevented from moving relative to, the external material at a location away from the tip surface, the internal material can be caused to shrink inside the external material, thereby sinking down from the tip surface of the filament. In order to accomplish the creation of the craters having a desired shape and depth at the tip surface of the filament, the internal material needs to be able to longitudinally shrink freely inside the external material. The internal and external materials may belong to the same or different groups of polymers, provided that any bond existing between the internal and external materials can be broken so that the internal and external materials can move relative to one another.

In one embodiment of the process, the internal material, or the entire filament, can be heated to a first temperature and then cooled to a second temperature, wherein the first temperature is a temperature between the glass-transition temperature and the melting temperature of the internal material; and the second temperature is around a room temperature. The first temperature can be from 90° C. to 140° C. The second temperature can be from 15° C. to 25° C. In another embodiment, the movement of the internal and external materials relative to one another can be accomplished by causing the filament to flex or bend, such as, e.g., during teeth brushing. Mechanical bending may be beneficial to break a bond, if any has been formed between the internal and external materials.

Uniaxially oriented linear polymers, such as, e.g., nylon 6, 10, nylon 6, 12, polyester (polyethylene terephthalate), and polyethylene, will shrink when exposed to temperatures between the glass transition and the melting point. The shrinkage rate will depends, among other things, on the material and the process parameters during fiber extrusion, drawing down, and cooling processes. The sinking, or receding, of the internal material from the tip surface occurs substantially in a direction parallel to the longitudinal axis of the filament. Consequently, the sinking of the internal material results in the creation of the crater walls that are substantially parallel to the longitudinal axis of the filament.

In one exemplary embodiment of the process, the toothbrush head with a plurality of filaments can be heated, e.g., in a steaming pot, to a temperature of about 100-130° C. and then cooled down, e.g., by cold water or by ambient air temperature, to about 20° C. In a typical manual or power toothbrush, for example, the filament's length is from about 6 mm to about 15 mm. The average depth of the craters, defined by the distance between the tip surface and the bottoms of the craters, can be from about 10 µm to about 50 µm. This amounts to the difference of approximately 0.07%-0.83% between respective shrinkage rates of the internal and external materials One skilled in the art would realize that the greater the heat shrinkage difference between the internal and external materials in a given filament, the deeper the crater formed by the shrinkage will be, all other relevant parameters being constant.

Another embodiment of the process may involve causing the filament to repeatedly bend multiple times and in multiple directions. For example, the toothbrush having filaments comprising PET as the external material and Nylon as the internal material can be subjected to brushing against a flat surface comprising bovine enamel. The internal material starts to recede, or sink, from the tip surface of the filaments after about 4000 strokes. As the filaments on the brush continue to brush against the surface, the depth of the craters continues to increase. After about 20000 strokes, the craters can reach a depth of from about 5 µm to about 15 µm. This results in the formation of the craters exhibiting clear and sharp surface edge and longitudinal walls extending from the crater's edges down to the crater's bottoms. The surface edge can have a curvature radius that is less than 5 µm. In other embodiments, the curvature radius can be less than 4 µm, less than 3 µm, and even less than 2 µm.

Alternatively or additionally, the craters can be likewise formed by a consumer routinely brushing the teeth. Continuous use of a toothbrush having the filaments of the disclosure would result in continuous process of sinking of the internal material and increase of the craters' depth. This, in turn, would facilitate the plaque-removal performance of the brush having the filaments of the disclosure.

In a further aspect, the disclosure is directed to a process for making an oral-care implement comprising a plurality of cleaning elements, wherein at least some of the cleaning elements comprise composite filaments having a plurality of craters at tip surfaces of free ends of the filaments. The process comprises: providing a plurality of composite filaments, each composite filament comprising an external material and an internal material, wherein the tip surface comprises the internal material surrounded by the external material, the internal material having longitudinal shrinkage characteristics that differ from those of the external material; profiling the tip surfaces of the plurality of composite filaments according to a predetermined pattern; affixing the plurality of composite filaments to a body of the oral-care implement; and causing the internal material to shrink inside the external material in the composite filaments, whereby the internal material comprising the tip surfaces sinks relative to the external material comprising the tip surface so that the plurality of craters is formed at the tip surfaces of the composite filaments, the craters having surface edges comprising the external material, bottoms comprising the internal material, and walls comprising the external material and extending between the edges and the bottoms.

BRIEF DESCRIPTION OF THE DRAWINGS

The embodiments set forth in the drawings are illustrative and exemplary in nature—and are not intended to limit the subject matter defined by the claims. The detailed description of the illustrative embodiments can be understood when read in conjunction with the drawings, where like structures are indicated with like reference numerals.

DETAILED DESCRIPTION

Figure 1:
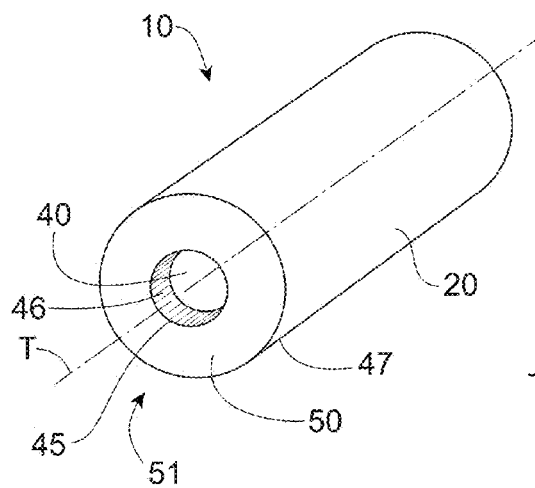
FIG. 1 schematically shows a perspective view of an exemplary embodiment of a filament of the present disclosure, the filament comprising a single internal material.
Figure 2:
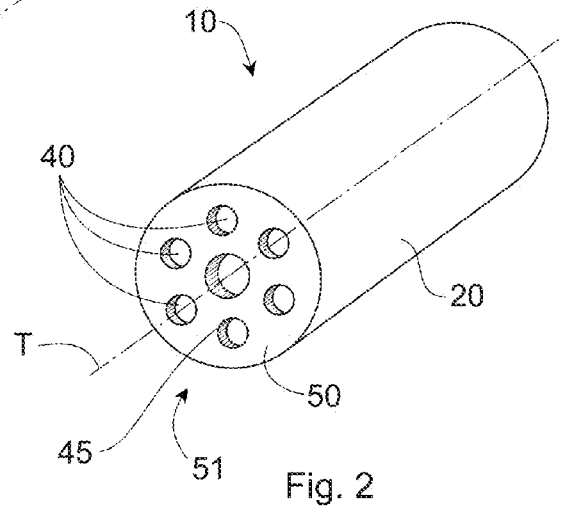
FIG. 2 schematically shows a perspective view of another exemplary embodiment of a filament of the present disclosure, the filament comprising different internal materials.
Figure 1A:
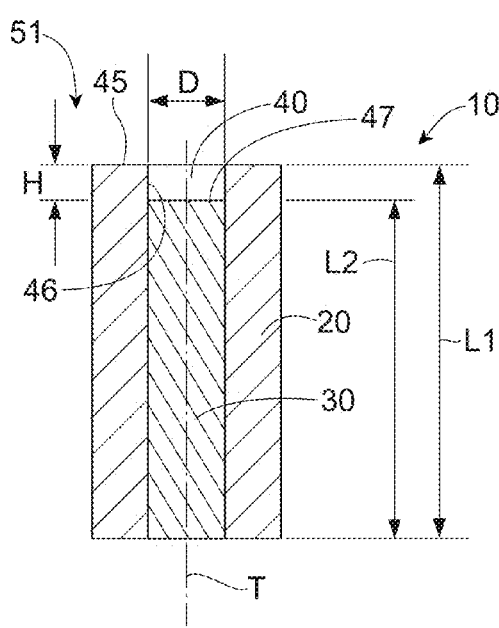
FIG. 1A schematically shows a longitudinal cross-sectional view of the filament shown in FIG. 1.
Figure 2A:
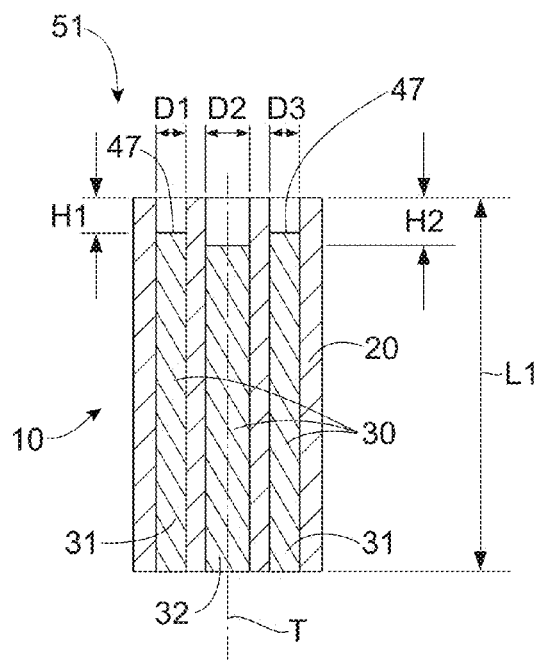
FIG. 2A schematically shows a longitudinal cross-sectional view of the filament shown in FIG. 2.

A filament 10 of the invention, shown in FIGS. 1-2A, can be beneficially used in any brush implement. The filament 10 can comprise a bi-component structure (FIGS. 1 and 1A) or a multi-component structure (FIGS. 2 and 2A). The filament 10 comprises an external material 20 and at least one internal material 30. One non-limiting example of the external material 20 is a material comprising polyester. One non-limiting example of the internal material 30 is a material comprising polyamide.

The filament 10 comprises an elongated flexible body having a length L, a longitudinal axis T, and a longitudinal outer surface comprising the external material 20. One skilled in the art will readily understand that because the filament 10 is a flexible structure, its longitudinal axis follows the shape of the filament. The filament 10 terminates with a tip 51 having a tip surface 50 that comprises the external material 20. The tip surface 50 has a plurality of craters 40 distributed throughout the tip surface 50 in a predetermined pattern. Each of the craters 40 has a surface edge 45 of a predetermined size and a predetermined shape, walls 46 extending longitudinally from the surface edge 45 and comprising the external material 20, and a bottom 47 comprising the internal material 20 and situated at a depth from the surface edge 45. Thus, the surface edge 45 is formed by the walls 46 and the tip surface 50 of the filament 10. The walls 46 of the crater and the filament's longitudinal axis T are substantially parallel—and may, in some embodiments, form therebetween an angle of less than 10 degrees.

The external material 20 has a first length L1, and the internal material 30 has a second length L2 (FIG. 1A). The first length L1 is greater than the second length L2, and a difference between the first length and the second length (L1−L2) constitutes the depth H of the craters 45 (FIG. 1A). The external material 20 and the internal material 30 may be beneficially selected to differ from one another in at least one characteristic or physical property. Such characteristic or physical property may include, without limitation, color, elasticity, density, hardness, surface energy, heat-shrinkage rate, longitudinal anisotropic-shrinkage rate, isotropic-shrinkage rate, bending-shrinkage rate, and any combination thereof.

In an embodiment of the filament shown, e.g., in FIGS. 2 and 2A, and comprising a first internal material 31 and a second internal material 32, the first internal material 31 differs from the second internal material 32 in at least one physical property selected from the group consisting of color, elasticity, density, hardness, surface energy, heat-shrinkage rate, longitudinal anisotropic-shrinkage rate, isotropic-shrinkage rate, bending-shrinkage rate, and any combination thereof. One skilled in the art will realize that in other embodiments of the filament 10, that may comprise more than two different internal materials, one internal material can likewise differ from the other internal material or materials in at least one physical property as described herein.

As shown in FIGS. 1 and 1A, the internal material 30 may comprise a single strand of material extending inside the filament 10 along the longitudinal axis T thereof. In such a configuration, the filament 10 has a single crater 40 disposed at the tip surface 50. In an embodiment of the filament 10 comprising two or more internal materials 30, the filament 10 may comprise a plurality of strands of internal material 30, or a plurality of strand of different internal materials 31, 32, separated from one another by the external material 20. In this configuration, the filament 10 has a plurality of craters 40 disposed at the tip surface 50.

Figure 3:
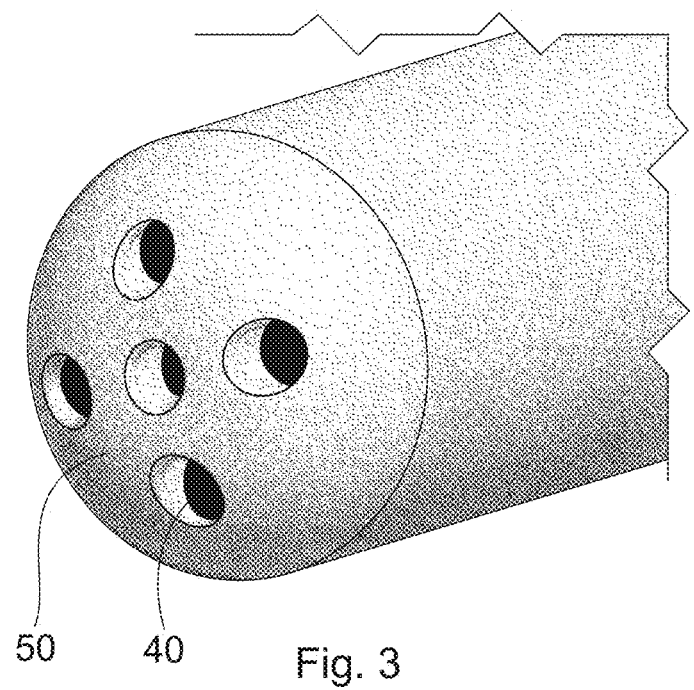
FIG. 3 schematically shows a perspective view of yet another exemplary embodiment of a filament of the present disclosure, the filament comprising a convex tip surface.
Figure 4:
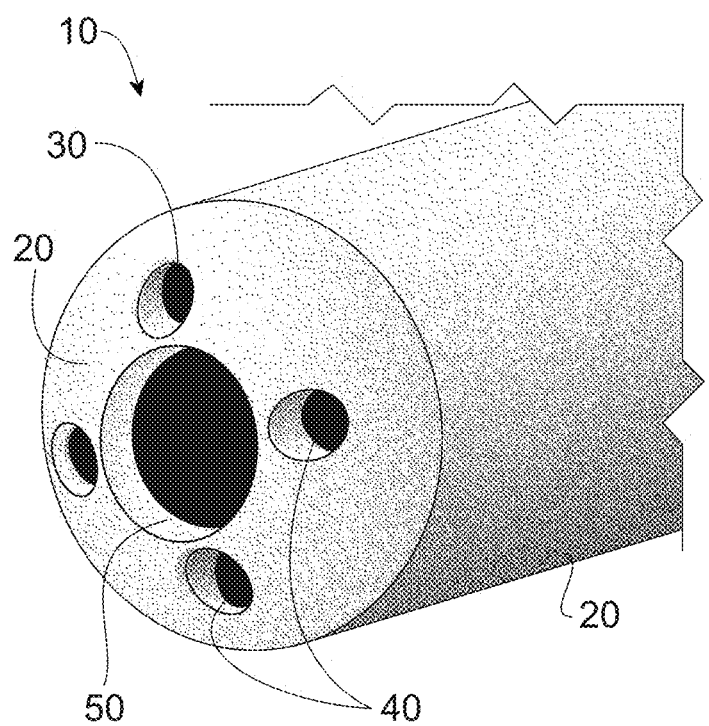
FIG. 4 schematically shows a perspective view of an exemplary embodiment of a filament of the present disclosure, the filament having a tip surface comprising a concave portion and convex portion.
Figure 3A:
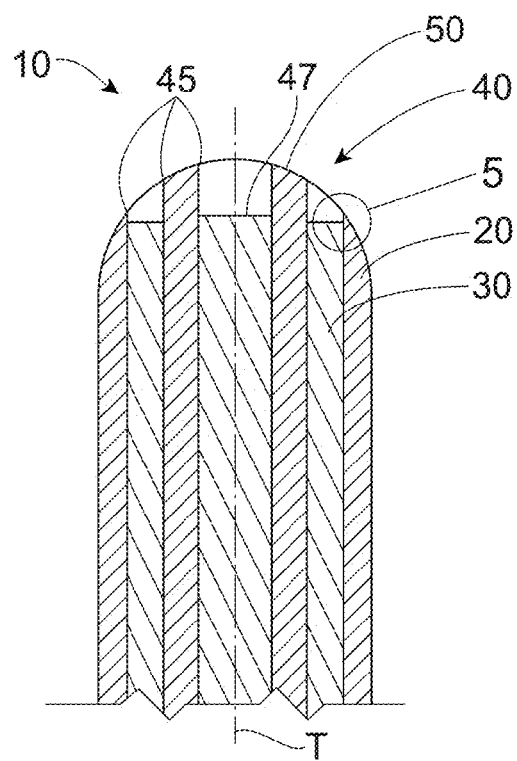
FIG. 3A schematically shows a longitudinal cross-sectional view of the filament shown in FIG. 3.
Figure 4A:
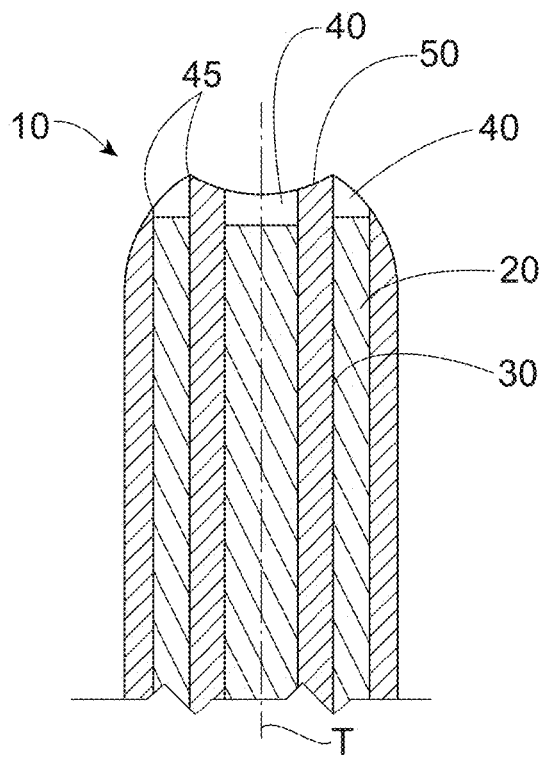
FIG. 4A schematically shows a longitudinal cross-sectional view of the filament shown in FIG. 4.
Figure 15:
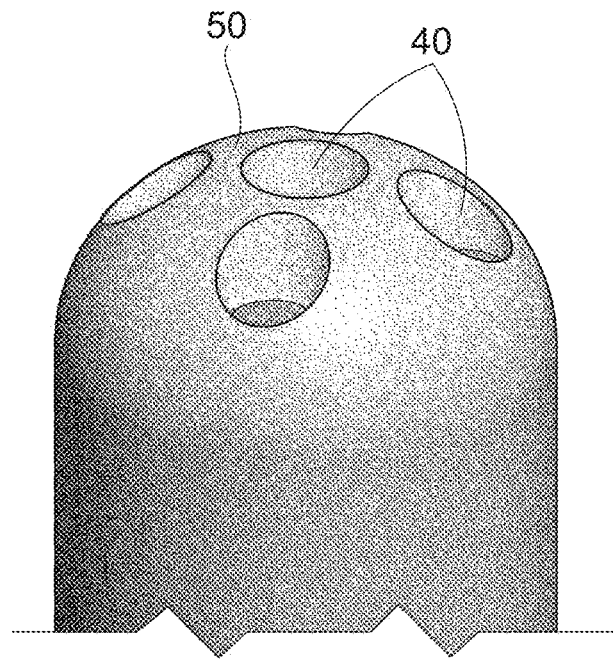
FIG. 15 is a schematic perspective view of an embodiment of the filament having a convex tip surface and a plurality of craters thereon.
Figure 15A:
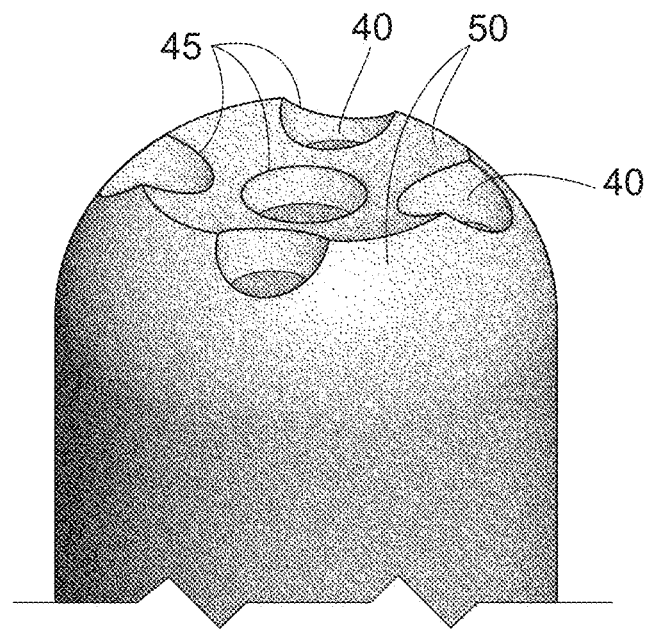
FIG. 15A is a schematic perspective view of an embodiment of the filament having a tip surface comprising a convex portion and a concave portion, wherein the tip surface includes a plurality of craters thereon.

The filament 10 can have a tip surface 50 of any suitable shape. In one exemplary embodiment, shown in FIGS. 3 and 3A, the tip surface 10 can at least partially be convex. In other exemplary embodiments, shown in FIGS. 1-2A, the tip surface 50 can at least partially be planar, or flat. In yet other exemplary embodiments, shown in FIGS. 4, 4A, and 15, the tip surface 50 can be at least partially concave. In FIG. 15A, the tip surface 50 comprises a combination of at least two of the above-listed shapes, a concave portion and a convex portion. Embodiments are contemplated in which the tip surface comprises an irregular shape.

Figure 5:
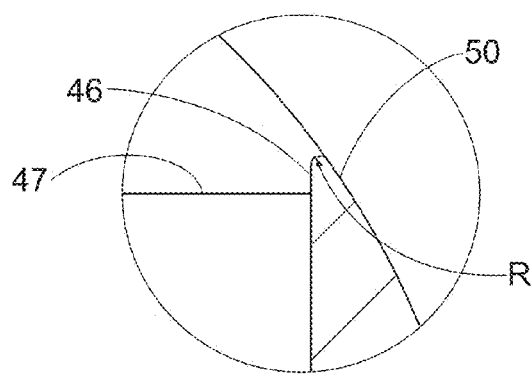
FIG. 5 schematically shows a fragment of the filament's tip surface and illustrates a curvature radius of an edge of a crater.

The craters 40, having sharp edges 45 located at the filament's tip surface 50, provide enhanced abrasion efficiency against a surface in contact with the moving tip surface 50. This sharpness of the craters' edges 45 can be defined by a radius R of curvature existing between the walls 46 of the crater 40 and the tip surface 50 comprising the external material 20, FIG. 5. In one embodiment, the surface edge of the crater has a curvature radius of less than 5 µm. In another embodiment, the surface edge of the crater has a curvature radius of less than 3 µm.

Figure 6:
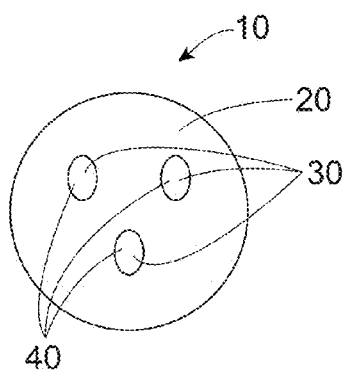
FIG. 6 schematically shows an exemplary embodiment of the filament's tip surface comprising generally elliptical craters.
Figure 7:
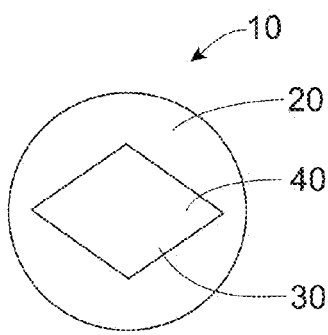
FIG. 7 schematically shows an exemplary embodiment of the filament's tip surface comprising a generally polygonal crater.

The edge 45, which has essentially a length and a shape of a tip-surface perimeter of the crater 40, can have any suitable form. Non-limiting examples include: a circle (FIGS. 1 and 2), an ellipse (FIG. 6), a polygon (FIG. 7), a star (FIG. 8), and any combination thereof, including regular and irregular shapes. In one embodiment, the crater may have an equivalent diameter D of from 1 µm to 70 µm. In another embodiment, the crater may have an equivalent diameter D of from 2 µm to 50 µm. In yet another embodiment, the crater may have an equivalent diameter of from 3 µm to 30 µm. In still another embodiment the crater may have an equivalent diameter of from 4 µm to 20 µm.

Figure 8:
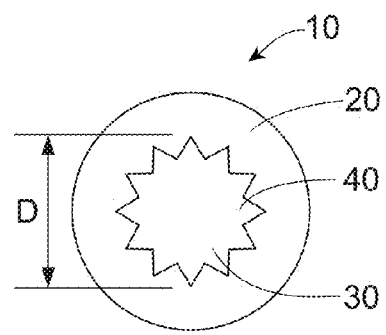
FIG. 8 schematically shows an exemplary embodiment of the filament's tip surface comprising a star-shaped crater.

As used herein, the term "equivalent diameter" refers to the diameter of an imaginary circle (or an imaginary sphere in the context of a three-dimensional element) circumferentially (or spherically) encompassing a non-circular shape of an element, such as, e.g., a non-circular shape of the crater (FIG. 8). An "equivalent diameter" of the crater having a circular shape is, of course, its real diameter. One skilled in the art will realize that the longer the combined length of all the edges 45 of the plurality of craters 40 disposed on the tip surface 50, the greater abrasion efficacy of the tip surface 50 can generally be expected, all other abrasion-relevant parameters being equal.

The number of craters 40, created at the tip surface 50 of the filament 10, can be dictated by multiple considerations, including, e.g., the intended application, size of the filament, size of the tip, size of the particles and chemical composition of material to be delivered and/or removed using the craters, and others. An embodiment is contemplated in which a single crater 40 is disposed on the tip surface 50, FIGS. 1, 7, 8. In other embodiments, there can be at least three or at least five craters 40 on the tip surface of the filament, FIGS. 3-6. In still other embodiment, the number of craters 40 can be between five and ten (FIG. 9) and between five and twenty five. A typical toothbrush, for example, can have from about 400 to about 1000 filaments. For example, in a basic brush having 36 tuft holes and an average number of filaments 24, there are 864 filaments altogether. If the filaments are stapled, i.e., bent in half, the number of their free ends would be 1728. If each of the filament tips has, on average, about 5 craters, the toothbrush having from about 400 to about 1000 filaments would have from about 2000 to about 5000 craters.

Individual craters 40 can differ from one another with respect to one or several parameters, including, without limitation, crater's depth, shape, and size. For example, in an embodiment of the filament comprising two or more internal materials (FIGS. 2 and 2A), the difference in craters' depth H can be created by using internal materials having differential shrinkage characteristics, particularly longitudinal anisotropic shrinkage characteristics. In FIG. 2A, e.g., the craters have differential depths: H1 and H2.

A synthetic fiber, which usually has a high length-to-diameter aspect ratio, has a strong anisotropic material structure. In a typical fiber-extrusion process, the polymer resin is first heated and transferred into a molten state inside an extruder. The melt can then be pressed through filtration layer and extruded through capillaries at a constant mass flow rate. Thereafter, polymer can be drawn down vertically—and can solidify while being cooled from extrusion temperature down to the ambient air temperature, or quenched in a cool water bath. During the draw down and cooling processes, the polymer chain naturally orients itself along the longitudinal direction of the fiber—and hence have a much higher shrink rate along the longitudinal direction than the cross direction.

In the fiber 10 of the invention, having a composite structure comprising the external material 20 and the internal material 30, anisotropic shrinkage occurs in the internal material 30, and may occur in the external material 20. The internal material 30 and the external material 20 may be composed and structured to have different shrinkage rates along the fiber's longitudinal direction L, or along the fiber's axis T. This is termed herein as "longitudinal anisotropic shrinkage rate," or simply "longitudinal shrinkage rate." The longitudinal shrinkage rate of the internal material 30 can be higher than that of the external material 20. The longitudinal shrinkage of the internal material 30 inside the external material 20 can cause the receding, or "sinking" of the internal material 30 down from the tip surface 50—and ultimately in the creation of the craters 40 formed on the filament's tip surface 50.

Depending primarily on the longitudinal shrinkage rate of the internal material 30 vis-à-vis that of the external material 20, the crater 40 may have the depth H of from 3 μm to 30 μm. More specifically, the depth H may be from 4 μm to 15 μm, and even more specifically from 1 μm to 15 μm. The depth H can be measured parallel to the longitudinal axis T as a distance between the tip surface 50, or edge 45, and the bottom 47 of the crater 40. In other words, the depth H of the crater 40 comprises a vertical length of the crater's walls 46.

Figure 10:
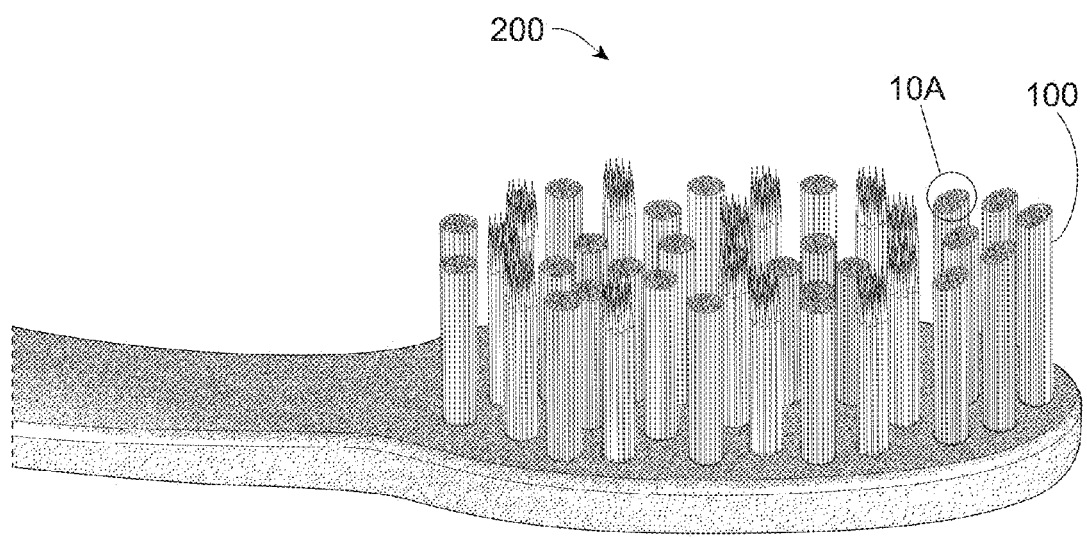
FIG. 10 schematically shows a perspective view of an embodiment of a toothbrush having the filaments of the disclosure.
Figure 10A:
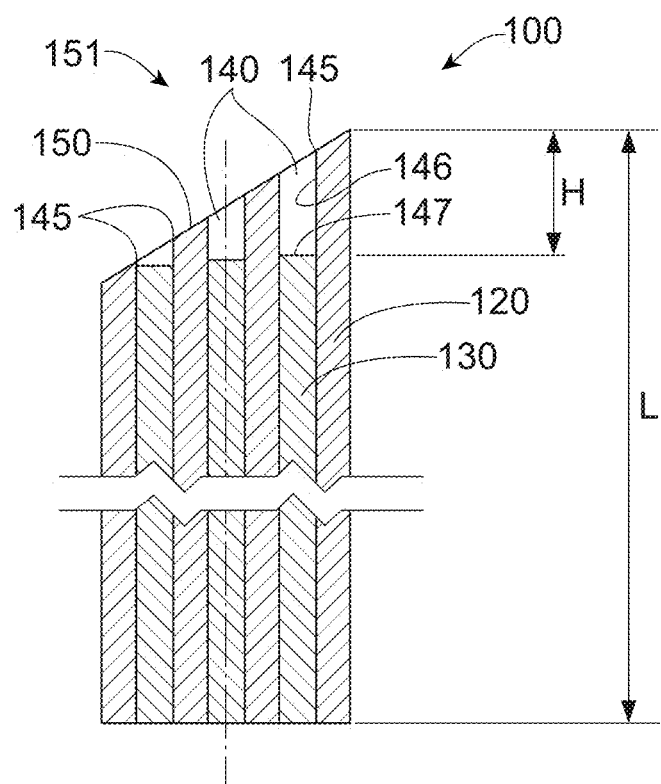
FIG. 10A schematically shows one of the filaments of the disclosure disposed on the toothbrush of FIG. 10.

In another aspect, the disclosure is directed to a filament 100 for use in an oral-care brush implement 200, FIG. 10. The filament 100, similarly to the filament 10 described herein above, comprises an elongated flexible body having a length L, a longitudinal axis T, and a longitudinal outer surface comprising an external material 120. The elongated flexible body terminates at a free end thereof with a tip 151 having a tip surface 150 comprising the external material 120. The tip surface 150 of the filament 100 has a plurality of craters 140 distributed therethrough in a predetermined pattern. The craters 140 have surface edges 145 of predetermined sizes and shapes. The craters 140 also have walls 146 extending longitudinally from the edges 145 and comprising the external material 120. Each of the craters 140 has a bottom 147 comprising at least one internal material 130. The bottom 147 is situated at a depth H from the surface edge 145. The external material 120 differs from the at least one internal 130 material in at least one physical property selected from the group consisting of color, elasticity, density, hardness, surface energy, heat-shrinkage rate, longitudinal anisotropic-shrinkage rate, isotropic-shrinkage rate, bending-shrinkage rate, and any combination thereof.

Figure 11A:
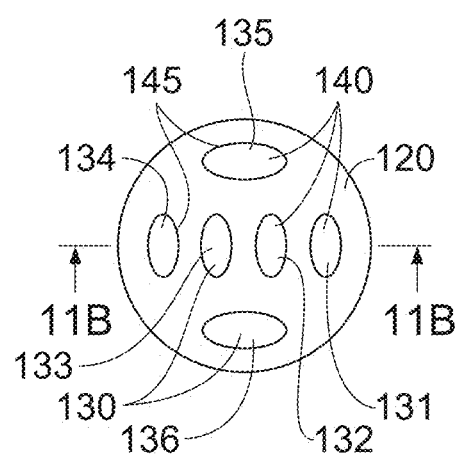
FIG. 11A schematically shows the filament's tip surface comprising craters formed by various internal materials.
Figure 11B:
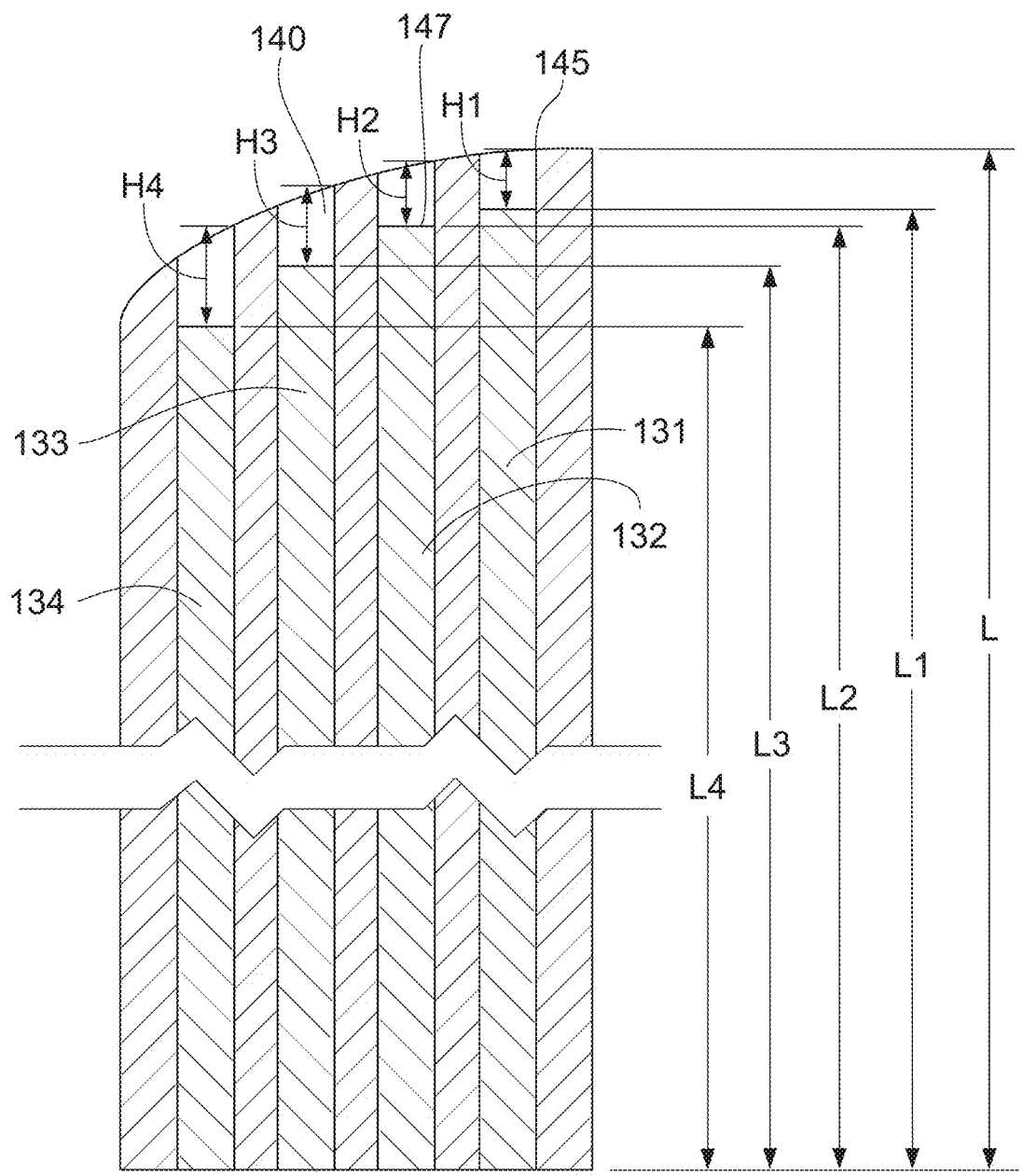
FIG. 11B is a longitudinal cross-section of the filament shown in FIG. 11.

Embodiments are contemplated in which the at least one internal material 130 comprises two or more internal materials 131, 132, 133, 134, 135, 136 (FIGS. 11A and 11B) that differ from one another in at least one physical property selected from the group consisting of color, elasticity, density, hardness, surface energy, heat-shrinkage rate, longitudinal anisotropic-shrinkage rate, isotropic-shrinkage rate, bending-shrinkage rate, and any combination thereof. In such embodiments, the strands of internal material 130 can shrink to have differential lengths, L1, L2, L3, L4—and the bottoms 47 of the craters 40, formed by different internal materials 31, 32, 33, 34 can be situated at different depths H1, H2, H3, H4 from the corresponding edges 45 of the craters 40. In one embodiment, the filament 100 can be structured to have the crater's depth, or craters' depths, gradually increase with the intended use of the oral-care brush implement 200. This aspect of the disclosure will be detailed herein below, in the context of a process for making the filament. Such a gradual increase of the depths of the craters may be substantially identical for all craters (e.g., in embodiments comprising a single internal material) or differential (e.g., in embodiments comprising different internal materials having disparate shrinkage rates).

Figure 13:
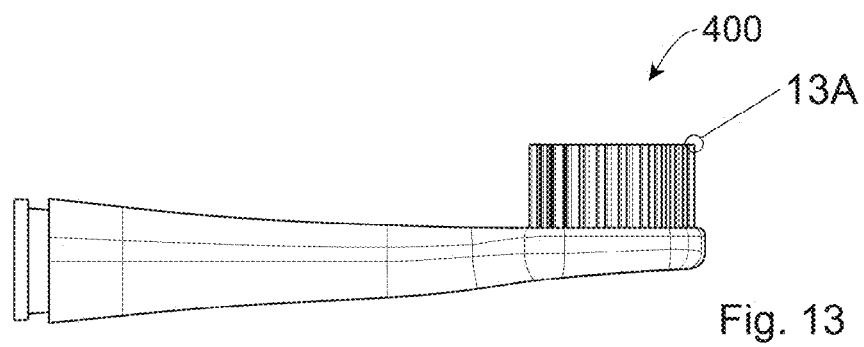
FIG. 13 is a schematic side view of an embodiment of an oral-care implement comprising a filament having at least one crater disposed on the filament's tip surface.
Figure 13A:
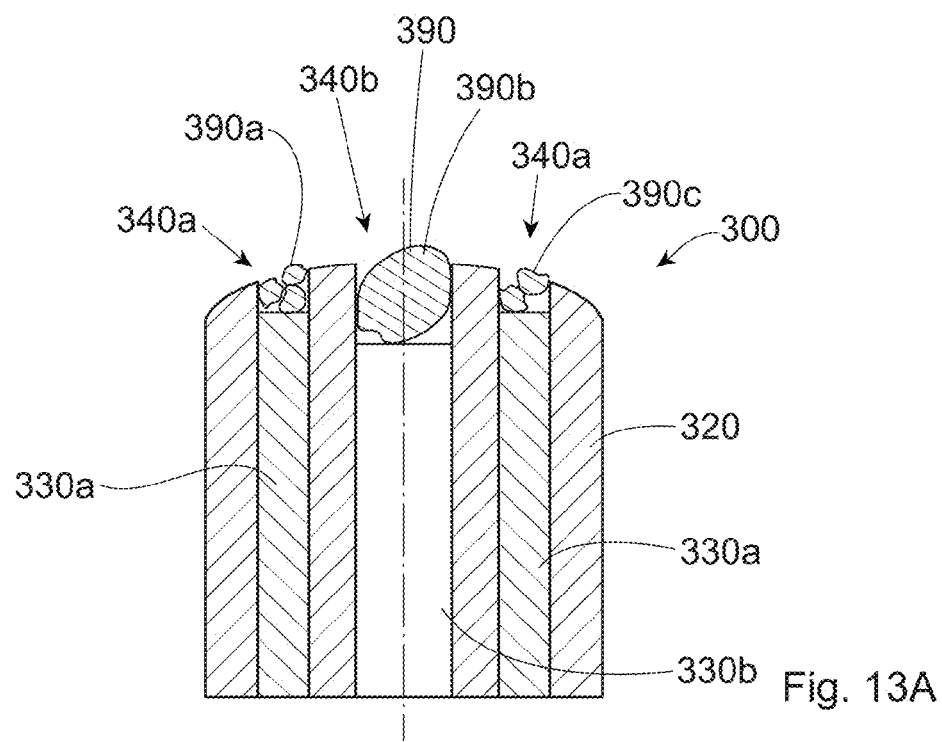
FIG. 13A is a fragmental cross-sectional view of the filament of the oral-care implement shown in FIG. 13.
Figure 13B:
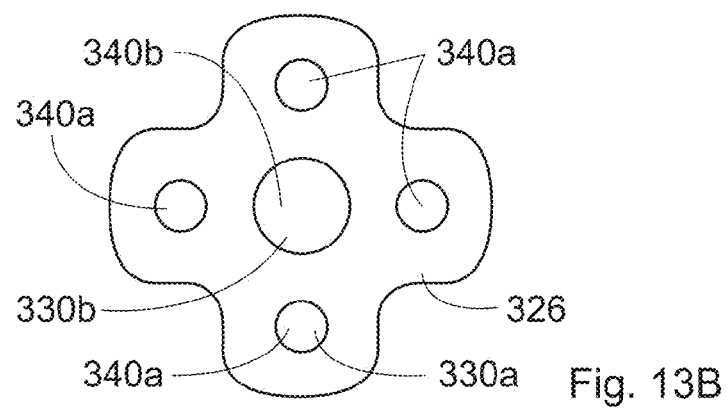
FIG. 13B is a fragmental top view of the filament shown in FIG. 13A, with dentifrice particles, shown in FIG. 13A, removed.

In addition to the primary benefit that can be provided by the filament of the disclosure, comprising enhanced abrasion efficiency due to the craters having sharp edges on the filament's tip surface, an additional beneficial effect may also have place due to a combination of the filament of the disclosure and a suitable dentifrice. FIGS. 13-13B schematically illustrate an exemplary embodiment of an oral-care implement 400 (schematically shown as a refill for a power brush) in combination with a dentifrice having abrasive particulate. Any suitable dentifrice may be used in combination with the oral-care implement of the disclosure. Non-limiting examples include: CREST toothpaste, CREST Pro-Health toothpaste, CREST Sensi-Relief Whitening toothpaste, CREST Pro-Health Clinical Plaque Control toothpaste, various CREST 3D toothpastes, and others. A typical dentifrice comprises, in addition to water, three main components including abrasives, fluoride, and detergents. Abrasive particles facilitate removal of plaque and calculus from, and polishing of, the surface of the teeth. Non-limiting examples of abrasives include particles of aluminum hydroxide (Al(OH)3), calcium carbonate (CaCO3), various calcium hydrogen phosphates, various silicas and zeolites, and hydroxyapatite (Ca5(PO4)3OH).

The dentifrice's particle size can be described by its average or median diameter or equivalent diameter. A distribution of particle sizes in a dentifrice should be taken into account as well. For example, abrasive silica particles in a typical cavity-protection toothpaste may have an equivalent diameter ranging from about 5 micron to about 20 micron and a load percentage by weight of around 10-15%. The CREST Pro-Health toothpaste, in addition to the typical 5-20 micron particles of silica Z119, has harder particles of silica Z109 having a similar equivalent diameter of 5-20 micron, and a total particle load of about 20% and greater.

The size distribution of particles in a given composition can be plotted as cumulative volume percent based on a function of the particle size. Cumulative volume percent is the percent, by volume, of a distribution having a particle size of less than or equal to a given value and where particle size is the diameter of an equivalent spherical particle. The median particle size in a distribution is the size, in microns, of the particles at the 50% point for that distribution. The size distribution and volume median diameter for a particle-size distribution may be calculated using a laser light scattering PSD system, such as, e.g., those commercially available from Malvern and/or determined using the methods disclosed in U.S. patent application 2007/0001037A1, published on Jan. 4, 2007. For example, the average volume weighted mean particle size of polyorganosilsesquioxane particles, and specifically polymethylsilsesquioxane particles, may range from about 1 to about 20 microns, from about 1 to about 15 microns, from about 2 to about 15 microns, from about 2 to about 12 microns, from about 3 to about 12 microns, from about 2 to about 10 microns, from about 3 to about 7 microns, from about 3 to about 6 microns, and from about 4 to about 6 microns. The average volume weighted mean particle size of the polyorganosilsesquioxane, and specifically polymethylsilsesquioxane particles, can be from about 3 to about 8, and from about 4 to about 7 microns; and the d(0.1) is from about 2 to about 4, from about 2 to about 3; and the d(0.9) can be from about 4 to about 9, and from about 5 to about 8 microns. As used herein, "d(0.1)" or "D10" is the size (e.g., in microns) of the particles sample below which 10% of the sample lies; and "d(0.9)" or "D90" is the size of the particles sample below which 90% of the sample lies. As used herein, "d(0.5)" or "D50" is the size (e.g., in microns) at which 50% of the particles sample is smaller and 50% is larger, also referred to as the "mass median diameter" or "MMD."

Without wishing to be bound by theory, we believe that generally, non-rolling particles provide best soil removal from the teeth surface. In some embodiments, therefore, it may be beneficial to create a plurality of craters 40 at the filament tips to capture smaller particles, having sizes about 5 microns and below, and turn them into effective cleaners. For example, silica "Z109" and "Z119," available from Huber Company, can be used. We further believe that as long as some particles have a size that is larger than the depth of the crater, the particles can contact the teeth surface and facilitate the removal of stain and plaque therefrom, FIG. 13A.

The oral-care implement 400, shown in FIGS. 13-13B includes a plurality of cleaning elements 300, at least some of which comprise a filament having craters 340 on its tip surface, as described herein. The craters 340 can be sized to accept, at least partially, dentifrice particles therein. The internal material of the filament 300, best shown in FIGS. 13A and 13B, comprises a first internal material 330a and a second internal material 330b. The first internal material 330a forms bottoms of several peripheral craters 340a, while the second internal material 330b forms bottoms of a central crater 340b. The first and second internal materials 330a, 330b can be selected to sink to differential depth relative to the tip surface of the filament 300. In the exemplary embodiment shown, the central crater 340b has a depth that is greater than those of the peripheral craters 340a. In addition, the central crater 340b has an equivalent diameter that is greater than those of the peripheral craters 340a. Consequently, the central crater 340b, having a relatively larger overall size, can accept therein relatively large dentifrice particles 340b. At the same time, the peripheral craters 330a, which cannot accept the large particles 390b because of the relative sizes thereof, can accept smaller dentifrice particles 340a.

The craters can be structured and configured to have the overall size, including their depth and equivalent diameter, greater than the average size of the dentifrice. In some embodiments, the craters can be sized so that each individual crater can receive a plurality a plurality of dentifrice particles, FIG. 15. The filament of the disclosure, having an assortment of craters' sizes proportionally matching the dentifrice particles, including the particles' size distribution in the dentifrice, may be beneficial.

Process

A process for making the filament 10 described herein above comprises, generally, providing a composite filament comprising an external material 20 and an internal material 30, wherein the tip surface 50 comprises the internal material 30 surrounded by the external material 20 and wherein the internal material 30 has longitudinal shrinkage characteristics that differ from those of the external material 20; and then causing the internal material 30 to shrink inside the external material 20.

The process may further comprise any and all of the following, typically conventional, steps: producing a continuous filament; cutting the continuous filament into a plurality of filaments 10 of predetermined length L; and profiling, trimming, end-rounding, polishing the tip surface 50 of the filament 10. Any known means of accomplishing these steps can be used, if suitable, in the process of the disclosure. For example, producing a continuous bi-component or multi-component filament can be accomplished by a co-extrusion method, followed by drawing. Extrusion, or co-extrusion, may include multiple spinning techniques, such as, e.g., wet spinning, dry spinning, melt spinning, gel spinning, electro-spinning, jet-wet spinning, and the like. Another technique for continuous production of composite filaments having constant cross-section is known in the art as "pultrusion."

Figure 12:
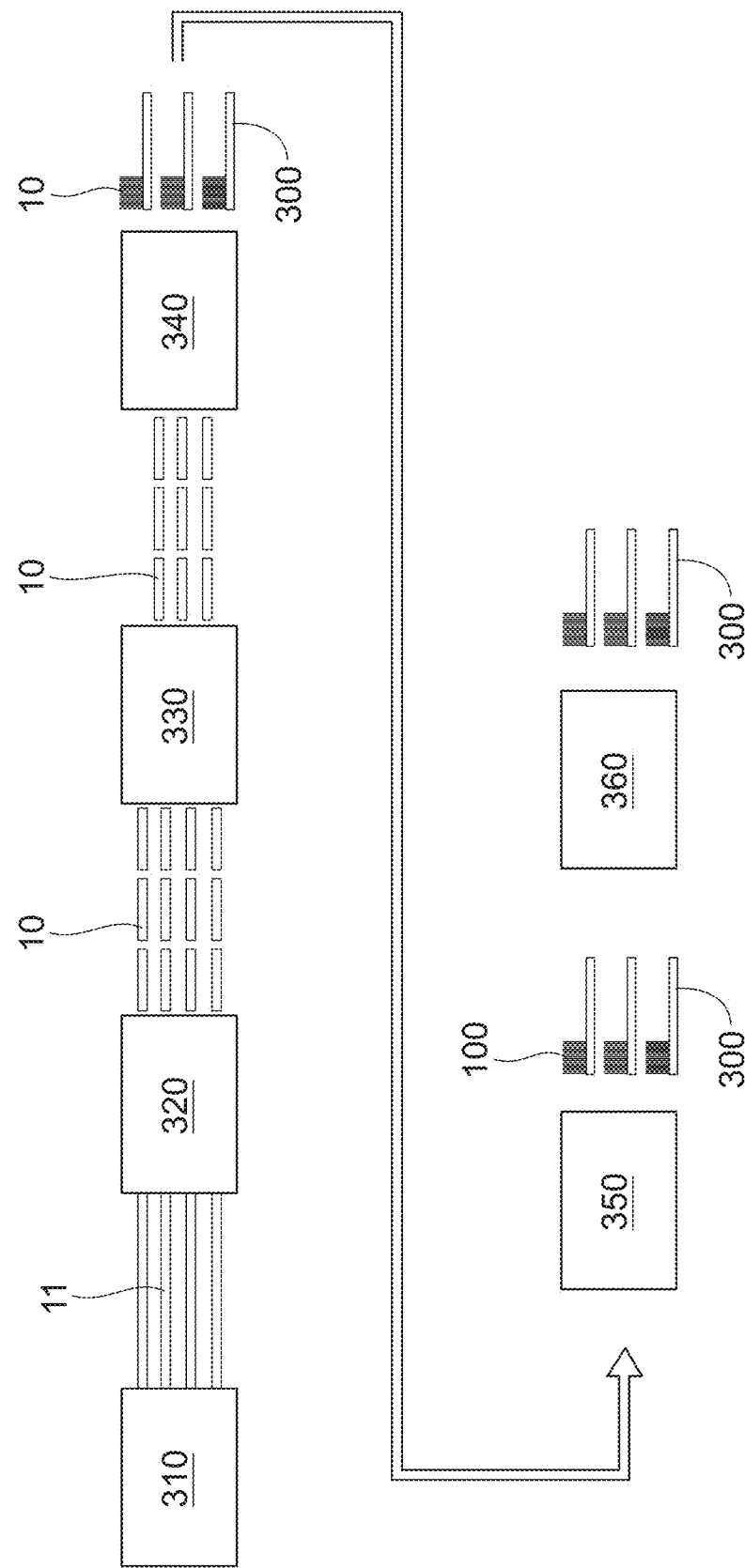
FIG. 12 is a schematic representation of an embodiment of a process for making an oral-care implement comprising a filament having at least one crater disposed on the filament's tip surface.

In FIG. 12, schematically showing the process of the disclosure, a continuous multi-component filament 11 can be produced, e.g., by a pultrusion technique, at a pultrusion station 310. The continuous filament 11 can then be cut, at a trimming station 320, into a plurality of filaments of predetermined length. Cutting can be accomplished by any conventional cutting means, such as a cutting blade, and a laser beam, or by known chemical means. Polishing/profiling, including end-rounding, of the filament's tip surface 50 can be accomplished, e.g., at a polishing station 330, by any suitable equipment known in the art. The tip surface 50 of the filament 10 can be profiled to acquire any desired shape, such as, e.g., a convex shape, a concave shape, a flat shape (either planar or angular), and any combination thereof.

In order to accomplish the creation of the craters 40 having a desired shape and depth at the tip surface 50 of the filament 10, the process may beneficially comprise a step of preventing the internal material 30 from moving relative to the external material 20 inside the filament at a location removed from the tip surface of the filament 10. Thus, the internal material 30 will be naturally caused to shrink essentially in one longitudinal direction, away from the tip surface 50 of the filament 10. Therefore, the step of profiling the tip surface 50 of the filament can be beneficially performed prior to causing the internal material 30 to shrink inside the external material 20. Likewise, preventing the internal material 30 from moving relative to the external material 20 inside the filament 10 can be beneficially performed prior to causing the internal material 30 to shrink inside the external material 20.

Any suitable technique allowing fixing the internal material 30 relative to the external material 20 at a location remote from the filament's free end can be used. In one embodiment of the process, the filament 10 can be affixed to a body of an oral-care implement at an end of the filament that is opposite to the tip surface 51 of the filament. This can be done by using any known method of attaching cleaning filaments to an oral-care implement, such as a toothbrush. Non-limiting examples of these methods include stapling, overmolding with a plastic material, a so-called hot-tufting, and any combination thereof. In an exemplary embodiment of the process illustrated in FIG. 12, the filament 10 can be imbedded into a body of an oral-care implement, such as a toothbrush 300, at an embedding station 340.

Alternatively, the filament 10 may be allowed to form craters 40 at both ends thereof. For example, in a brush-making process that uses a traditional stapling technique, the filament can be folded, and attached to the brush to form a U shape in a tuft hole, in the area of stapling. There, the filament's center can be affixed to the brush head by an anchor or slug. Such a filament will have the opposite tips forming two tip surfaces. A typical stapling would not secure the internal material to the external material in the area of stapling. Consequently, the internal-material's shrinkage will occur at both ends of the filament—and will likely result in sinking of the internal material from the two surface tips. Therefore, the craters can be formed at both ends of the U-shaped filament. The corresponding craters, i.e., those formed by the shrinkage of the same strand of the second material, will likely have equal depths.

After the internal material 30 has been affixed to, or otherwise prevented from moving relative to, the external material 20 at a location away from the tip surface 50, the internal material 30 can be caused to shrink inside the external material 20, thereby sinking down from the tip surface 50 of the filament 10. Alternatively, the internal material 30 can be caused to shrink at both ends of the filament 10, as is described herein in the context of stapling. In the exemplary embodiment of the process, shown in FIG. 12, the internal material 30, or the entire filament 10, can be heated, e.g., at a heating station 350, to a first temperature. The first temperature is a temperature between the glass-transition temperature and a melting temperature of the internal material 30—and can be, e.g. for polyamide from 90° C. to 140° C.

In general, the shrinkage and crystallization behavior in semi-crystalline polymers, e.g., Nylon, PET, and PBT, are closely related. One type of crystallization behavior depends on temperature and time. Slow cooling, e.g., may cause high-degree crystallization, which would result in a relatively high rate of shrinking. A rapid drop of the temperature drop, on the other hand, may cause a lower degree of crystallization, which would result in a relatively low rate of shrinking. Fillers may influence the shrinkage behavior due to their low expansion capacity. One skilled in the art would realize that the properties of semi-crystalline polymers can be determined not only by the degree of crystallinity, but also by other factors, such as, e.g., the size and orientation of the molecular chains. Another type of crystallization may occur upon extrusion used in making fibers and films. During atypical extrusion process, the polymer is forced through a nozzle, which creates tensile stress in the material resulting in at least partial alignment of its molecules. Such alignment can be considered as crystallization, and it affects the material properties as well. Uniaxially oriented linear polymers, such as, e.g., nylon 6, nylon 66, poly(ethylene terephthalate), and polyethylene, will shrink when exposed to temperatures between the glass transition and the melting point. The shrinkage rate will depends, among other things, on the material and the process parameters during fiber extrusion, drawing down, and cooling processes.

Thereafter, the internal material 30, or the entire filament 10, can be cooled, e.g., at a cooling station 360, to a second temperature. There, the filament 10 can be, e.g., quenched in a cool water bath or cool air. Alternatively, the filament 10 can be simply exposed to an ambient room temperature, e.g., from about 15° C. to about 25° C.

The sinking, or receding, of the internal material 30 from the tip surface 50 occurs substantially in a direction parallel to the longitudinal axis T of the filament 10. Consequently, the sinking of the internal material 30 results in the creation of the crater 40 having walls 46 that are substantially parallel to the longitudinal axis T of the filament 10.

In one exemplary embodiment of the process, a head of the toothbrush 300 having a plurality of filaments 10 can be heated, e.g., in a steaming pot, to a temperature of about 100° C.-130° C. and then cooled down, e.g., by cold water or by ambient air temperature, to about 20° C. In a typical manual or power toothbrush, for example, the filament's length is from about 6 mm to about 15 mm. The average depth of the craters, defined by the distance between the tip surface and the bottoms of the craters, can be from about 10 μm to about 50 μm. This amounts to the difference of 0.067%-0.833% between respective shrinkage rates of the internal and external materials. One skilled in the art would realize that the greater the heat shrinkage difference between the internal and external materials 30, 20, in a given filament 10, the deeper the crater 40 formed by the shrinkage will be, all other relevant parameters being constant.

Another embodiment of the process may involve causing the filament 10 to repeatedly bend multiple times. Such a bending may beneficially performed in multiple directions relative to the filament's longitudinal axis. For example, a toothbrush having filaments comprising PET as the external material 20 and Nylon as the internal material 30 can be subjected to brushing against a flat surface comprising bovine enamel. The internal material starts to recede, or sink, from the tip surface 50 of the filaments 10 after about 4000 strokes. As the filaments 10 on the brush continue to brush against the surface, the depth of the craters 40 continues to increase. After about 20000 strokes, the craters 40 can reach a depth of from about 5 μm to about 15 μm. This results in the formation of the craters 40 exhibiting clear and sharp surface edge 45 and longitudinal walls 46 extending from the crater's edges 45 down to the crater's bottoms 47. The surface edge can have a curvature radius R that is less than 5 μm. In other embodiments, the curvature radius can be less than 4 μm, less than 3 μm, and even less than 2 μm.

Alternatively or additionally, the craters 40 can be likewise formed as a result of a routine teeth brushing by a consumer. Continuous use of a toothbrush having the filaments of the disclosure would result in a continuous process of sinking of the internal material and increase of the craters' depth. This, in turn, would facilitate the plaque- and stain-removal performance of the brush having the filaments of the disclosure. Thus, for example in the context of oral-care, the present disclosure provides an oral-care implement comprising bristles having sharp-edges craters disposed on the bristles' tip surfaces, which would not degrade—but may, instead, even improve its teeth-cleaning performance—with the passage of time. A typical toothbrush, comprising conventional bristle tufts, is expected to provide its top teeth-cleaning performance in the beginning of its use. With every use, cleaning efficacy of the bristles will gradually decline, primarily due to the tendency of the bristles material's to loose stiffness and bend recovery. It is well known in the art that after about three months of normal wear and tear, the brush's plaque- and stain-removal efficacy is substantially decreased relative to a new brush. One published clinical study, comparing a new toothbrush to one that had been artificially worn to simulate three months of use, demonstrated that after a single brushing the mean reduction in whole mouth plaque for the new brush was 0.39 compared to 0.30 for the worn brush—a 30-percent reduction ((0.39−0.30)/0.30× 100=30%). See, *Journal of Clinical Dentistry*, P. Warren et al., Vol. XIII, #3, 2002. Dentists generally agree that one should replace a toothbrush every three or four months or sooner if the bristles become frayed.

The fibers of the disclosure, on the other hand, have the ability to retain, and even increase to some extent, their toothcleaning efficacy—due to the existence, or creation/deepening during use, of the sharp-edged craters that can be formed and/or deepened as a result of flexing and bending of the filaments, which normally occurs when the brush is used. Therefore, while traditional cleaning filaments, not having craters at the tips of their filaments, are expected to reduce their stain-removal efficacy during their initial use, the cleaning filaments of the disclosure are expected to retain and even improve their stain-removal efficacy with the passage of time.

Example

Figure 9:
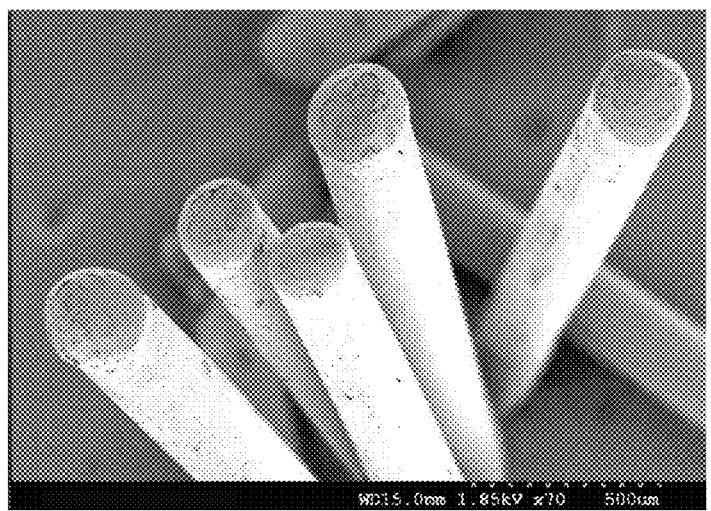
FIG. 9 is a microscopic photograph showing the filament's tip surface comprising an external material and a plurality of islands comprising an internal material, wherein craters have not yet been formed.
Figure 9A:
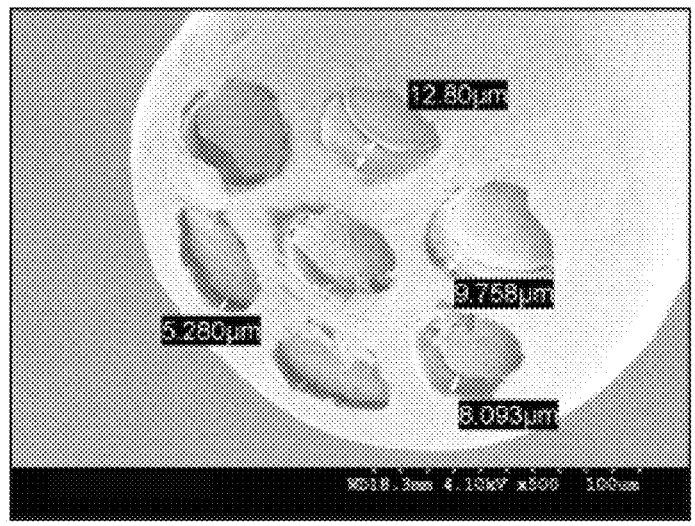
FIG. 9A is a microscopic photograph similar to that of FIG. 9 and showing the filament's tip surface with the craters formed thereon.

A composite, substantially cylindrical monofilament, comprising Nylon as the internal material and PET as the external material, and having a diameter of 7 mils (177.8 microns), can be coextruded as is known in the art. The filament comprises seven strands of the internal material comprising standard Nylon-6, each strand having a diameter of 30 microns. The strands' pattern can be essentially symmetrical, with six strands evenly distributed (at a circular pace of approximately 30 degrees from one another) around one centrally/axially positioned strand, as is best shown in FIGS. 9 and 9A. The strands are distributed approximately equidistantly from one another and from the filament's periphery.

The filament is then cut to form individual bristles that are stapled onto a toothbrush head to form tufts of a uniform length of about 11 millimeters. The tufts are trimmed, to have a substantially flat working surface comprising a plurality of tip surfaces. Free ends of the individual filaments may be rounded, as is known in the art. A microscopic image of the tip surface is taken, using, e.g., a Hitachi S-3500N Scanning Electron Microscope with a Robinson backscatter detector and Oxford Instruments EDS, FIG. 9. The image shows that the portions of the internal material, encompassed on the tip surface by the external material, are substantially even with the external material, i.e., they neither recede nor protrude relative to the tip surface formed by the external material.

Thereafter, the toothbrush's filaments can be conditioned by being rubbed against a bovine enamel surface surrounded by an auto-polymerizing methacrylate resin surface or a methacrylate resin surface alone for 20000 brushing strokes in ultrapure water. During the conditioning phase, microscopic images of the tip surface are taken periodically to visualize the change in tip surface structure, using the Hitachi S-3500N SEM, FIG. 9A. The images show that after 4000 to 20000 strokes every portion of the internal material, encompassed by the external material on the tip surface, recedes or "sinks" down. The depths to which the internal material sinks in each of the craters may vary among the craters. In the exemplary embodiment of the filament shown in FIG. 9A, e.g., the craters have the depths of from about 5 μm (0.005 mm) to about 13 μm (0.013 mm). One skilled in the art, however, would readily realize that in other embodiments the craters' depth can vary. The craters' depth can be, e.g. and without limitation, from 1 μm to 30 μm, from 1 μm to 15 μm, from 2 μm to 20 μm, from 2 μm to 10 μm, from 3 μm to 30 μm, from 4 μm to 20 μm, from 5 μm to 15 μm, and from 5 μm to 10 μm.

A process for preparation of the test bovine enamel surface can be performed substantially as described in an article by Stookey, G. K.; Burkhard, T. A.; Schemehorn, B. R., published, under the title "In Vitro Removal of Stain with Dentifrice," in the Journal of Dental Research 61(11); pp. 1236-1239; November 1982, which article is incorporated herein by reference. Specimen preparation can include the following steps. Bovine permanent central incisors are cut to obtain labial enamel specimens approximately 10 mm$^2$. The specimens are embedded in an auto-polymerizing methacrylate resin with only the enamel surfaces exposed. The enamel surfaces are smoothed and polished on a lapidary wheel utilizing 100 grit, and then by 600-grit sanding media under a constant flow of water. The specimens are lightly etched by a 60-second immersion in 0.12 N hydrochloric acid, followed by a 30-second immersion in a supersaturated solution of sodium carbonate. A final etch is performed with 1% phytic acid for 60 seconds; (5) the specimens are rinsed in deionized water. Then, the staining process of the test surface can be conducted, including the following steps. The specimens are attached to stainless steel rods and mounted on a staining apparatus comprising a platform supporting a stainless steel cylinder connected to a 2-rpm motor. Beneath the cylinder is a removable 2-Liter trough containing a staining broths that includes 8.6 g of finely-ground instant coffee, 8.6 g of finely-ground instant tea, 6.5 g of gastric mucin, and 0.13 g ferric chloride dissolved into 2000 ml of sterilized trypticase soy broth; the broth also contains approximately 104 ml of 24-hour Sarcinalutea turtox culture. The apparatus with the enamel specimens attached and the stain broth in place is then placed in an incubator at 37° C. The specimens are rotated continuously through the staining broth and air. The staining broth is replaced twice daily for four consecutive days. With each broth change, the trough and specimen are rinsed with deionized water to remove any loose deposits. After the four-day staining period, a darkly-stained film or coating is apparent on the enamel surfaces. The specimens can be then removed from the staining apparatus, rinsed well, and refrigerated until being used.

Each chip can be individually numbered on its back and on one side using a permanent marker. Images of the stained bovine chips can then be taken using spectrophotometric or digital imaging methods. For all measurements, the chips should be placed in the same orientation. The images can then be masked and analyzed via Optimus digital imaging software using largest area of interest possible for each chip. The number of pixels per image should be within 10-15% for all images. The software analysis provides baseline color values of the stain reported in CIEL*a*b* color space. Chips having baseline L* value greater than 45 should not be used. The imaged chips can then be sorted into groups of three so that the average L* baseline values are similar for all legs of the study.

A V-8 Cross-Brushing Machine with Accessories, ISO/ADA Design, available from Sabri Dental Enterprises Inc. of Illinois, can be used for testing the performance of toothbrushes having filaments comprising the craters of the disclosure, in accordance with the ISO/DIS standard specification No. 11609. The machine is designed with 4 stations on each side; this facilitates experiment timing to designate a brushing leg for each side, and maintain through all brushings. Eight test specimens' stations can be encapsulated with the toothbrushes for the test. An adjustable brushing pressure on the test specimens can be from about 10 grams to about 1000 grams, and more specifically from about 150 to about 200 grams. The machine's brushing stroke speed, with an adjustable stroke control, can be set from 100 or 200 strokes per minute, and more specifically a stroke speed of 176.5 strokes per minute, or 2.94 Hertz, or 200 strokes per 68 seconds, can be used. The stroke length is about 3.8 centimeter over a 1-centimeter-square chip. The toothbrushes should be oriented on the machine so that their cleaning elements/filaments are perpendicular to the test surface.

Then the toothbrush having the filaments or bristles comprising the craters at their tip surfaces, as described herein, can be tested in removing stains from the calibrated stained bovine enamel chip on a brushing machine. For comparison, a toothbrush with standard cylindrical filaments having the same diameter, length, and tuft-trim pattern (but no craters at the tip surfaces of the filaments) can be also used to remove stains from the identically calibrated stained bovine enamel chip.

Toothbrushes can be prepared for installation on the machine as follows. The brush's handle can be cut off near the brush's neck to leave about 2-3 cm of the body of the brush for mounting on the machine. Then a hole can be drilled through the neck of so that a pin can be embedded therein. The brush head pin can be inserted into the brushing-station block and screwed in place using nylon thumb screws and nuts (screws: #6-32×¾", nuts: #8-32; can be obtained from Small Parts, Inc., of Florida). Springs should be properly positioned into each toothbrush setup to apply approximately 50-200 grams of tension onto each toothbrush (as measured using OHAUS Spring Scale).

For the test brushing, a minimum of three chips can be used for each treatment leg, and the data can be reported as the average. The chips are placed on the brushing machine and secured with tightening screws. Typically, chips are moved among stations between brushings (while the brush heads remain in place), and rotated 90 degrees after each brushing treatment, to avoid formation of a groove in the enamel that may be caused by continuous brushing in the same direction. The glass tubes are filled with slurry/solution or water, and installed on each brushing station being used; they can be secured with 3.5"×1.5" rubber bands. Water/solution/slurry should cover the mounted chip at an angle of approximately 45 degrees.

The machine's counter should be reset to desired number of strokes, and the machine can be started. Standard number of strokes is 200 for initial brushing, and the machine is set to a frequency of 200 strokes per 1 minute 08 seconds. Subsequent number of strokes or time brushing can be determined by the rate of cleaning or bleaching. Number of strokes reported is cumulative; therefore, if first brush is 200 strokes, and there is a desire to see the results of 1000 strokes, the machine should be set to brush another 800 strokes (200+800=1000). Recommended standard for stain removal is to brush 200, 1000, and 2000 strokes (and anything in between, as needed), and for testing deposition and retention 10,000 and 20,000 strokes total.

During the brushing, each brush should be oriented perpendicular to the chip's surface, and the chips should be centered relative to the brush's head for even brushing of the surface. Then the chips can be imaged after each brushing and analyzed for change in CIEL*a*b* values. Techniques of the measuring and reporting of color in CIEL*a*b* color space can be found, e.g., in Hunter, Richard S., and Harold, Richard W: The Measurement of Appearance, 2nd ed., John Wiley and Sons, Inc. New York, N.Y. USA, 1987; and CIE International Commission on Illumination, Recommendations on Uniform Color Spaces, Color-Difference Equations, Psychometric Color Terms, Supplement No. 2 to CIE Publication No. 15, Colorimetry, 1971 and 1978; both documents being incorporated herein by reference.

Delta E ($\Delta$E), or Delta L* ($\Delta$L*) or ($\Delta$L*), can be used to report stain removal. $\Delta E=0.5((L2^*-L1^*)^2+(a2^*-a1^*)^2+(b2^*-b1^*)^2)$. The a* value is believed to have little impact on the overall results; and both a* and b* are not linear in their change during bleaching/cleaning process. Therefore, it may not be recommended to follow a* or b* values for the purposes of stain-removal testing in this method. Bovine chips typically start out with an L* value in the 20's after staining, and can be bleached to an L* value of 80-85. The scale of L* is 0-100.

Images can be captured using a JVC KY-F75U CCD camera under broad-source lighting. The camera can be positioned at 45°/0° geometry with respect to the lights, and calibrated every hour with a standard color-control chart. Images can be analyzed via Optimus image-analysis software and data reported in CIEL*a*b* color space.

Figure 14:
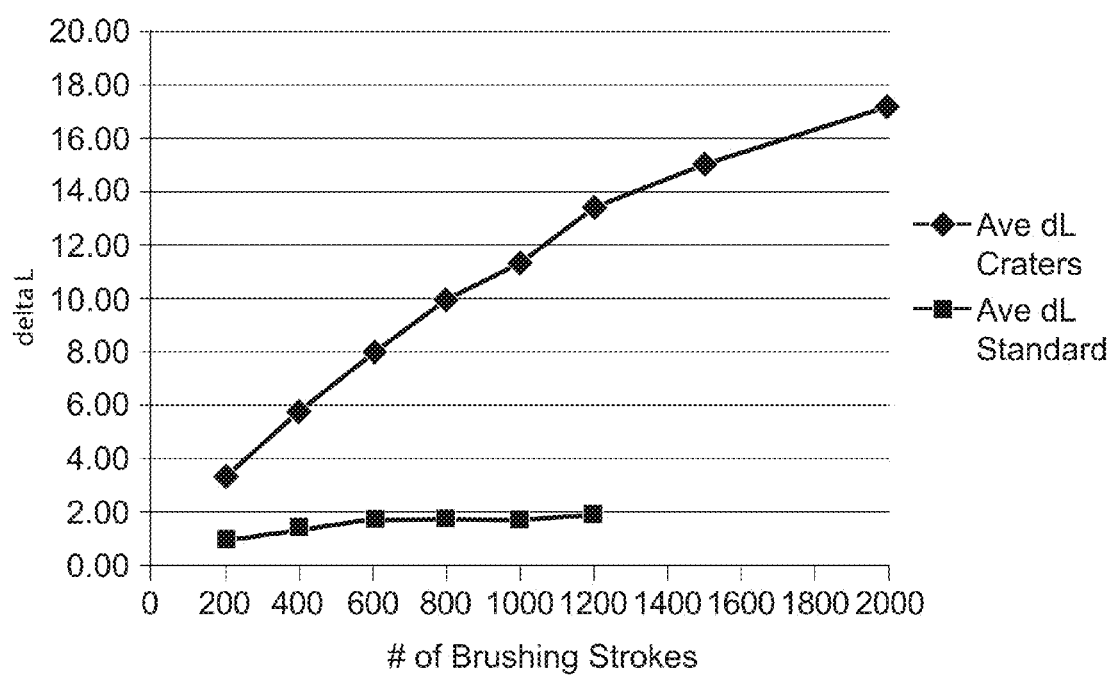
FIG. 14 is a diagram illustrating stain-removal efficacy of a toothbrush having filaments of the disclosure compared to that of a toothbrush having conventional filaments.

The toothbrush having the filaments with craters at the tip surfaces remove significantly more stain than the toothbrush with a cylindrical filament, as is shown in the Stain-Removal Chart of FIG. 14. The diagram of FIG. 14 also shows that the stain-removal efficacy of the filaments having craters ("Ave dL* Craters") increases with the number of brushing strokes.

While particular embodiments have been illustrated and described herein, various other changes and modifications may be made without departing from the spirit and scope of the invention. Moreover, although various aspects of the invention have been described herein, such aspects need not be utilized in combination. It is therefore intended to cover in the appended claims all such changes and modifications that are within the scope of the invention.

The terms "substantially," "essentially," "about," "approximately," and the like, as may be used herein, represent the inherent degree of uncertainty that may be attributed to any quantitative comparison, value, measurement, or other representation. These terms also represent the degree by which a quantitative representation may vary from a stated reference without resulting in a change in the basic function of the subject matter at issue. Further, the dimensions and values disclosed herein are not to be understood as being strictly limited to the exact numerical values recited. Instead, unless otherwise specified, each such dimension is intended to mean both the recited value and a functionally equivalent range surrounding that value. For example, values disclosed as "5 µm" or "20° C." are intended to mean "about 5 µm" or "about 20° C.," respectively.

The disclosure of every document cited herein, including any cross-referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein—or that it alone, or in any combination with any other reference or references, teaches, suggests, or discloses any such invention. Further, to the extent that any meaning or definition of a term in this document conflicts with any meaning or definition of the same or similar term in a document incorporated by reference, the meaning or definition assigned to or contextually implied by that term in this document shall govern.

What is claimed is:

1. A process for making a filament having at least one crater at a tip surface of at least one free end of the filament, the process comprising:
   providing a composite filament comprising an external material and an internal material, wherein the tip surface comprises the internal material surrounded by the external material, the internal material having longitudinal shrinkage characteristics that differ from those of the external material;
   causing the internal material to shrink inside the external material, whereby the internal material comprising the tip surface sinks relative to the external material comprising the tip surface so that at least one crater is formed at the tip surface of the filament, wherein the at least one crater comprises a bottom formed by the internal material and walls formed by the external material, and wherein the at least one crater has a surface edge of a predetermined size and a predetermined shape.

2. The process of claim 1, wherein providing a composite filament comprises providing the filament in which the external material differs from the internal material in at least one physical property selected from the group consisting of color, elasticity, density, hardness, surface energy, heat-shrinkage rate, longitudinal anisotropic-shrinkage rate, isotropic-shrinkage rate, bending-shrinkage rate, and any combination thereof.

3. The process of claim 1, wherein providing a filament comprises providing a filament having the internal material that comprises a plurality of strands extending inside the filament along the longitudinal axis thereof and separated from one another by the external material, and wherein the at least one crater comprises a plurality of craters.

4. The process of claim 1, wherein the process comprises extruding a continuous filament and cutting the continuous filament into a plurality of filaments of predetermined length.

5. The process of claim 1, wherein the process comprises profiling the tip surface of the filament.

6. The process of claim 1, wherein profiling the tip surface of the filament comprises causing the tip of the filament to acquire, at least partially, a shape selected from the group consisting of a concave shape, a convex shape, a planar shape, and any combination thereof.

7. The process of claim 1, wherein causing the internal material to shrink inside the external material comprises heating the internal material to a first temperature and then cooling the internal material to a second temperature, wherein the first temperature is a temperature between the glass-transition temperature and the melting temperature of the internal material, and the second temperature is a room temperature.

8. The process of claim 7, wherein the first temperature is from 90° C. to 140° C.

9. The process of claim 7, wherein the second temperature is from 15° C. to 25° C.

10. The process of claim 1, wherein causing the internal material to shrink inside the external material comprises causing the filament to repeatedly bend multiple times and in multiple directions.

11. The process of claim 1, wherein causing the internal material to shrink inside the external material comprises causing the filament to be repeatedly brushed against a surface.

12. The process of claim 1, the process comprising preventing the internal material from moving relative to the external material inside the filament at a location removed from the tip surface of the filament.

13. The process of claim 12, wherein preventing the internal material from moving relative to the external material inside the filament at a location removed from the tip surface of the filament comprises affixing a portion of the filament at the location removed from the tip surface to a body of an oral-care implement.

14. The process of claim 13, wherein affixing a portion of the filament to a body of an oral-care implement comprises a method selected from the group consisting of stapling, overmolding, hot tufting, and any combination thereof.

15. The process of claim 1, wherein profiling the tip surface of the filament occurs prior to causing the internal material to shrink inside the external material.

16. The process of claim 1, wherein preventing the internal material from moving relative to the external material inside the filament occurs prior to causing the internal material to shrink inside the external material.

17. The process of claim 1, wherein causing the internal material to shrink inside the external material results in the at least one crater having the walls substantially parallel to the longitudinal axis of the filament.

18. The process of claim 1, wherein causing the internal material to shrink inside the external material results in the at least one crater comprising the surface edge having the curvature radius of less than 5 μm.

19. The process of claim 1, wherein causing the internal material to shrink inside the external material results in the at least one crater comprising the surface edge having the curvature radius of less than 3 μm.

20. A process for making an oral-care implement comprising a plurality of cleaning elements, wherein at least some of the cleaning elements comprise composite filaments having a plurality of craters at tip surfaces of free ends of the filaments, the process comprising:
   providing a plurality of composite filaments, each composite filament comprising an external material and an internal material, wherein the tip surface comprises the internal material surrounded by the external material, the internal material having longitudinal shrinkage characteristics that differ from those of the external material;
   affixing the plurality of composite filaments to a body of the oral-care implement;
   profiling the tip surfaces of the plurality of composite filaments according to a predetermined pattern; and
   causing the internal material to shrink inside the external material in the composite filaments, whereby the internal material comprising the tip surfaces sinks relative to the external material comprising the tip surface so that the plurality of craters is formed at the tip surfaces of the composite filaments, the craters having surface edges comprising the external material, bottoms comprising the internal material, and walls extending between the edges and the bottoms and comprising the external material.

* * * * *